(12) United States Patent
Kuran et al.

(10) Patent No.: US 11,037,688 B2
(45) Date of Patent: Jun. 15, 2021

(54) NUCLEAR FUEL CONTAINING RECYCLED AND DEPLETED URANIUM, AND NUCLEAR FUEL BUNDLE AND NUCLEAR REACTOR COMPRISING SAME

(71) Applicant: Atomic Energy of Canada Limited, Chalk River (CA)

(72) Inventors: Sermet Kuran, Mississauga (CA); Mustapha Boubcher, Burlington (CA); Cathy Cottrell, Ancaster (CA); Eric Carl Alemendra Araujo, Toronto (CA)

(73) Assignee: ATOMIC ENERGY OF CANADA LIMITED, Chalk River (CA)

( * ) Notice: Subject to any disclaimer, the term of this patent is extended or adjusted under 35 U.S.C. 154(b) by 493 days.

(21) Appl. No.: 16/131,963

(22) Filed: Sep. 14, 2018

(65) Prior Publication Data

US 2019/0057784 A1  Feb. 21, 2019

Related U.S. Application Data

(63) Continuation of application No. 13/885,582, filed as application No. PCT/IB2010/002914 on Nov. 15, 2010, now abandoned.

(51) Int. Cl.
*G21C 3/326* (2006.01)
*G21C 3/328* (2006.01)

(52) U.S. Cl.
CPC ............. *G21C 3/326* (2013.01); *G21C 3/328* (2013.01); *Y02E 30/30* (2013.01)

(58) Field of Classification Search
CPC ......... G21C 3/326; G21C 3/328; G21C 1/024
USPC ....................................................... 376/435
See application file for complete search history.

(56) References Cited

U.S. PATENT DOCUMENTS 5,202,085 A * 4/1993 Aoyama ................ G21C 3/328
376/435

FOREIGN PATENT DOCUMENTS

RU      2200987 C2    3/2003

OTHER PUBLICATIONS

"Fuel Temperature Coefficient", Nuclear-Power.net, http://www.nuclear-power.net/nuclear-power/reactor-physics/nuclear-fission-chain-reaction/reactivity-coefficients-reactivity-feedbacks/fuel-temperature-coefficient-doppler-coefficient/ (last accessed Jul. 27, 2016). (Year: 2016).*

(Continued)

*Primary Examiner* — Jack W Keith
*Assistant Examiner* — Daniel Wasil
(74) *Attorney, Agent, or Firm* — Norton Rose Fulbright Canada LLP

(57) ABSTRACT

Fuel bundles for a nuclear reactor are described and illustrated, and in some cases includes fuel elements each having a first fuel component of recycled uranium, and a second fuel component of at least one of depleted uranium and natural uranium blended with the first fuel component, wherein the blended first and second fuel components have a first fissile content of less than 1.2% wt of $^{235}U$. Other fuel bundles are also described and illustrated, and include a first fuel element including recycled uranium, the first fuel element having a first fissile content of no less than 0.72 wt % of $^{235}U$; and a second fuel element including at least one of depleted uranium and natural uranium, the second fuel element having a second fissile content of no greater than 0.71 wt % of $^{235}U$.

33 Claims, 5 Drawing Sheets

(56) References Cited

OTHER PUBLICATIONS

Canadian Office Action issued in Canadian Application No. 2,820,125, dated Jan. 23, 2018.
Horhoianu et al., "Technical Feasibility of the Use of RU-43 Fuel in CANDU-6 Reactors of the Cernavoda NPP", IAEA-TECDOC-CD-1630, p. 148-159, Nov. 2009.
Chang-Joon Jeong et al., "Compatibility Analysis on Existing Reactivity Devices in CANDU 6 Reactors for DUPIC Fuel Cycle", Nuclear Science and Engineering, vol. 134, p. 265-280, Mar. 2000.
Canadian Office Action issued in Canadian Application No. 2,820,125, dated Feb. 15, 2017.
Canadian Office Action issued in Canadian Application No. 2,820,125, dated Dec. 21, 2018.
"Chinese Candu Reactor Trials Uranium Reuse", World Nuclear News, Mar. 24, 2010, http://www.world-nuclear-news.org/ENF-Chinese_reactor_trials_Candu_fuel_reuse-2403101.html.
"Introduction to Nuclear Reactor Kinematics", Module 12, p. 4-6, Jul. 1997, http://canteach.candu.org/Content%20Library/20041112.pdf.
Korean Office Action issued in Korean Application No. 10-2017-7017346, dated Oct. 22, 2017.
Korean Office Action issued in Korean Application No. 10-2017-7017346, dated Oct. 29, 2018.
Del Cul, G. D. et al., "Analysis of the Reuse of Uranium Recovered From the Reprocessing of Commercial LWR Spent Fuel", Oak Ridge National Laboratory, US Department of Energy, Jan. 2009.
Korean Office Action issued in Korean Application No. 2019-069514146, dated Sep. 26, 2019.

\* cited by examiner

NUCLEAR FUEL CONTAINING RECYCLED AND DEPLETED URANIUM, AND NUCLEAR FUEL BUNDLE AND NUCLEAR REACTOR COMPRISING SAME

CROSS-REFERENCE TO RELATED APPLICATIONS

This application is a continuation of U.S. application Ser. No. 13/885,582, which was the National Stage of International Application No. PCT/IB10/02914, filed Nov. 15, 2010.

BACKGROUND

Nuclear reactors generate energy from a nuclear chain reaction (i.e., nuclear fission) in which a free neutron is absorbed by the nucleus of a fissile atom in a nuclear fuel, such as Uranium-23 5 ($^{235}U$). When the free neutron is absorbed, the fissile atom splits into lighter atoms, and releases more free neutrons to be absorbed by other fissile atoms, resulting in a nuclear chain reaction, as is well understood in the art. Thermal energy released from the nuclear chain reaction is converted into electrical energy through a number of other processes also well known to those skilled in the art.

The advent of nuclear power reactors adapted to burn nuclear fuel having low fissile content levels (e.g., as low as that of natural uranium) has generated many new sources of burnable nuclear fuel. These sources include waste or recycled uranium from other reactors. This is not only attractive from a cost savings standpoint, but also based upon the ability to essentially recycle spent uranium back into the fuel cycle. Recycling spent nuclear fuel stands in stark contrast to disposal in valuable and limited nuclear waste containment facilities.

For these and other reasons nuclear fuel and nuclear fuel processing technologies that support the practices of recycling nuclear fuel and burning such fuel in nuclear reactors continue to be welcome additions to the art.

SUMMARY

In some embodiments of the present invention, a fuel bundle for a nuclear reactor is provided, and comprises a plurality of fuel elements each including a first fuel component of recycled uranium; and a second fuel component of at least one of depleted uranium and natural uranium blended with the first fuel component, wherein the blended first and second fuel components have a first fissile content of less than 1.2 wt % of $^{235}U$.

Some embodiments of the present invention provide a fuel bundle for a nuclear reactor, wherein the fuel bundle comprises a first fuel element including recycled uranium, the first fuel element having a first fissile content of no less than 0.72 wt % of $^{235}U$; and a second fuel element including at least one of depleted uranium and natural uranium, the second fuel element having a second fissile content of no greater than 0.71 wt % of $^{235}U$.

In some embodiments, any of the fuel bundles and methods just described are utilized in a pressurized heavy water reactor, wherein the fuel bundles are located within one or more tubes of pressurized water that flow past the fuel bundles, absorb beat from the fuel bundles, and perform work downstream of the fuel bundles.

Other aspects of the present invention will become apparent by consideration of the detailed description and accompanying drawings.

DETAILED DESCRIPTION

Before any embodiments of the invention are explained in detail, it is to be understood that the invention is not limited in its application to the details of embodiment and the arrangement of components set forth in the following description or illustrated in the accompanying drawings. The invention is capable of other embodiments and of being practiced or of being carried out in various ways.

A number of nuclear fuels according to various embodiments of the present invention are disclosed herein. These fuels can be used in a variety of nuclear reactors, and are described herein with reference to pressurized heavy water reactors. Such reactors can have, for example, pressurized horizontal or vertical tubes within which the fuel is positioned. An example of such a reactor is a Canadian Deuterium Uranium (CANDU) nuclear reactor, a portion of which is shown schematically in FIG. 5. Other types of reactors can have un-pressurized horizontal or vertical tubes with holes in them.

Pressurized heavy water nuclear reactors are only one type of nuclear reactor in which various nuclear fuels of the present invention can be burned. Accordingly, such reactors are described herein by way of example only, it being understood that the various fuels of the present invention can be burned in other types of nuclear reactors.

Similarly, the various fuels of the present invention described herein can be positioned in any form within a nuclear reactor for being burned. By way of example only, the fuel can be loaded into tubes or can be contained in other elongated forms (each of which are commonly called "pins" or "elements", referred to herein only as "elements" for sake of simplicity). Examples of elements used in some embodiments of the present invention are indicated at 22 in FIGS. 1-4, and are described in greater detail below. In the case of fuel contained within tubes, the tubes can be made of or include zirconium, a zirconium alloy, or another suitable material or combination of materials that in some cases is characterized by low neutron absorption.

Together, a plurality of elements can define a fuel bundle within the nuclear reactor. Such fuel bundles are indicated schematically at 14 in FIG. 5. The elements of each bundle 14 can extend parallel to one another in the bundle. If the reactor includes a plurality of fuel bundles 14, the bundles 14 can be placed end-to-end inside a pressure tube 18. In other types of reactors, the fuel bundles 14 can be arranged in other manners as desired.

Figure 5:
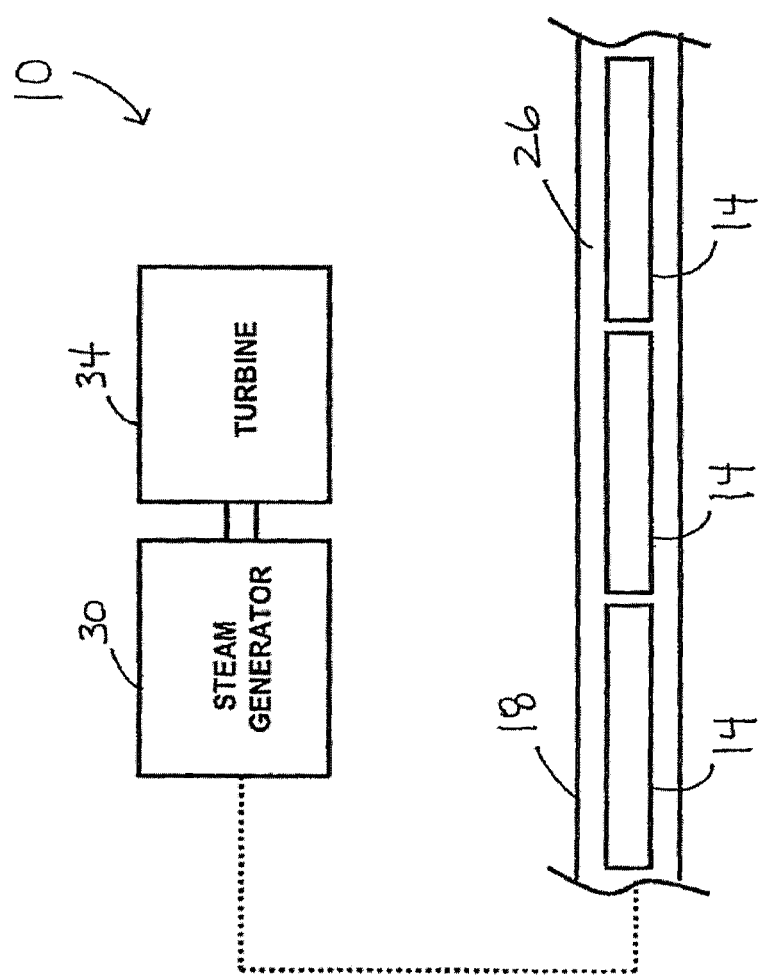
FIG. 5 is a schematic diagram of a nuclear reactor employing any of the fuel bundles of FIGS. 1-4.

With continued reference to FIG. 5, when the reactor 10 is in operation, a heavy water coolant 26 flows over the fuel bundles 14 to cool the fuel elements and remove heat from the fission process. The nuclear fuels of the present invention are also applicable to pressure tube reactors with different combinations of liquids/gasses in their heat transport and moderator systems. In any case, coolant 26 absorbing heat from the nuclear fuel can transfer the heat to downstream equipment (e.g., a steam generator 30), to drive a prime mover (e.g., turbine 34) to produce electrical energy.

Canadian Patent Application No. 2,174,983, filed on Apr. 25, 1996, describes examples of fuel bundles for a nuclear reactor that can comprise any of the nuclear fuels described herein. The contents of Canadian Patent Application No. 2,174,983 are incorporated herein by reference.

The various nuclear fuels of the present invention can be used (e.g., blended) in conjunction within one or more other materials. Whether used alone or in combination with other materials, the nuclear fuel can be in pellet form, powder form, or in another suitable form or combination of forms. In some embodiments, fuels of the present invention take the form of a rod, such as a rod of the fuel pressed into a desired form, a rod of the fuel contained within a matrix of other material, and the like. Also, fuel elements made of the fuels according to the present invention can include a combination of tubes and rods and/or other types of elements.

As described in greater detail below, fuels according to various embodiments of the present invention can include various combinations of nuclear fuels, such as depleted uranium (DU), natural uranium (NU), and reprocessed or recycled uranium (RU). As used herein and in the appended claims, references to "percentage" of constituent components of material included in nuclear fuel refers to percentage weight, unless specified otherwise. Also, as defined herein, DU has a fissile content of approximately 0.2 wt % to approximately 0.5 wt % of $^{235}U$ (including approximately 0.2 wt % and approximately 0.5 wt %), NU has a fissile content of approximately 0.71 wt % of $^{235}U$, and RU has a fissile content of approximately 0.72 wt % to approximately 1.2 wt % of $^{235}U$ (including approximately 0.72 wt % and approximately 1.2 wt %).

Recycled Uranium

Reprocessed or recycled uranium (RU) is manufactured from spent fuel created from nuclear power production using light water reactors (LWRs). A fraction of the spent fuel is made up of uranium. Therefore, chemical reprocessing of spent fuel leaves behind separated uranium, which is referred to in the industry as reprocessed or recycled uranium. Natural Uranium (NU) contains only the three isotopes $^{234}U$, $^{235}U$, and $^{238}U$. However, after irradiation in a LWR and cooling, the resulting RU has an isotopic composition different from natural uranium. In particular, RU includes four additional types of uranium isotopes that are not present in natural uranium: $^{236}U$ and $^{232}U$, $^{233}U$, and $^{237}U$ (generally considered impurities). Accordingly, the presence of these four additional isotopes can be considered a signature for RU.

It should also be understood that the isotopic composition of RU is dependent on many factors, such as the initial $^{235}U$ content in the fuel prior to irradiation (i.e., fresh fuel), the origin(s) of the fuel, the type of reactor in which the fuel was burned, the irradiation history of the fuel in the reactor (e.g., including burnup), and the cooling and storage periods of the fuel after irradiation. For example, most irradiated fuels are cooled for at least five years in specially engineered ponds to ensure radiological safety. However, the cooling period can be extended to 10 or 15 years or longer.

RU often includes chemical impurities (e.g., Gadolinum) caused by fuel cladding, fuel doping, and separation and purification methods used on the RU. These chemical impurities can include very small quantities of transuranic isotopes, such as Plutonium-238 ($^{238}Pu$), $^{239}Pu$, $^{240}Pu$, $^{241}Pu$, $^{242}Pu$, Neptunium-23 7 ($^{237}Np$), Americium-241 ($^{241}A$ m), Curium-242 ($^{242}Cm$) and fission products, such as Zirconium-95/Niobium-95 ($^{95}Zr/^{95}Nb$), Ruthenium-103 ($^{103}Ru$), $^{106}Ru$, Cesium-134 ($^{134}Cs$), $^{137}Cs$, and Technetium-99 ($^{99}Tc$). Other impurities often present in RU include: Aluminum (Al), Boron (B), Cadmium (Cd), Calcium (Ca), Carbon (C), Chlorine (Cl), Chromium (Cr), Copper (Cu), Dysprosium (Dy), Flourine (F), Iron (Fe), Magnesium (Mg), Manganese (Mn), Molybdenum (Mo), Nickel (Ni), Nitrogen (N), Phosphorous (P), Potassium (K), Silicon (Si), Sodium (Na), Sulphur (S), and Thorium (Th).

Depleted Uranium

As stated above, depleted uranium (DU) has a fissile content of approximately 0.2 wt % to approximately 0.5 wt % of $^{235}U$ (including approximately 0.2 wt % and approximately 0.5 wt %). DU is uranium primarily composed of the isotopes Uranium-23 8 ($^{238}U$) and Uranium-235 ($^{235}U$). In comparison, natural uranium (NU) is approximately 99.28 wt % $^{238}U$, approximately 0.71 wt % $^{235}U$, and approximately 0.0054 wt % percent $^{234}U$. DU is a byproduct of uranium enrichment, and generally contains less than one third as much $^{235}U$ and $^{234}U$ as natural uranium. DU also includes various impurities, such as: Aluminum (Al), Boron (B), Cadmium (Cd), Calcium (Ca), Carbon (C), Chlorine (Cl), Chromium (Cr), Copper (Cu), Dysprosium (Dy), Flourine (F), Gadolinium (Gd), Iron (Fe), Magnesium (Mg), Manganese (Mn), Molybdenum (Mo), Nickel (Ni), Nitrogen (N), Phosphorous (P), Potassium (K), Silicon (Si), Sodium (Na), Sulphur (S), and Thorium (Th).

Blended Fuel

It will be appreciated that in many applications, the uranium content of many nuclear fuels is too high or too low to enable such fuels to be burned in a number of nuclear reactors. Similarly, the constituent components of RU ($^{234}U$, $^{235}U$, $^{236}U$, and $^{238}U$) and the above-described impurities ($^{232}U$, $^{233}U$, and $^{237}U$) typically found in RU can prevent RU from being a viable fuel in many reactors. However, the inventors have discovered that by blending RU with DU, the fissile content of $^{235}U$ in the resulting nuclear fuel can be brought into a range that is acceptable for being burned as fresh fuel in many nuclear reactors, including without limitation pressurized heavy water nuclear reactors (e.g., pressurized heavy water nuclear reactors having horizontal fuel tubes, such as those in CANDU reactors). Similar results can be obtained by blending RU with NU to reduce the fissile content of $^{235}U$ in the resulting nuclear fuel to an acceptable range for being burned as fresh fuel.

Whether blended with DU or NU, RU can be blended using any method known in the art, such as but not limited to using an acid solution or dry mixing.

In some embodiments, the nuclear reactor fuel of the present invention includes a first fuel component of RU and a second fuel component of DU that have been blended together to have a combined fissile content of less than 1.2 wt % of $^{235}U$. In such fuels, the RU can have a fissile content of approximately 0.72 wt % of $^{235}U$ to approximately 1.2 wt % of $^{235}U$. In other embodiments, the RU in such fuels can have a fissile content of approximately 0.8 wt % of $^{235}$U to approximately 1.1 wt % of $^{235}$U. In other embodiments, the RU in such fuels can have a fissile content of approximately 0.9 wt % of $^{235}$U to approximately 1.0 wt % of $^{235}$U. In still other embodiments, the RU in such fuels can have a fissile content of approximately 0.9 wt % of $^{235}$U. In each of these embodiments, the DU of such fuels can have a fissile content of approximately 0.2 wt % of $^{235}$U to approximately 0.5 wt % of $^{235}$U.

Accordingly, by blending lower $^{235}$U fissile content DU with the higher $^{235}$U fissile content RU, the resulting blended RU/DU nuclear fuel can have a fissile content of less than 1.0 wt % of $^{235}$U in some embodiments. In other embodiments, the resulting blended RU/DU nuclear fuel can have a fissile content of less than 0.8 wt % of $^{235}$U. In other embodiments, the resulting RU/DU nuclear fuel can have a fissile content of less than 0.72 wt % of $^{235}$U. In still other embodiments, the resulting RU/DU nuclear fuel can have a fissile content of approximately 0.71 wt % of $^{235}$U, thereby resulting in a natural uranium equivalent fuel generated by blending RU and DU.

In some embodiments, the nuclear reactor fuel of the present invention includes a first fuel component of RU and a second fuel component of NU that have been blended together to have a combined fissile content of less than 1.2 wt % of $^{235}$U. In such fuels, the RU can have a fissile content of approximately 0.72 wt % of $^{235}$U to approximately 1.2 wt % of $^{235}$U. In other embodiments, the RU in such fuels can have a fissile content of approximately 0.8 wt % of $^{235}$U to approximately 1.1 wt % of $^{235}$U. In other embodiments, the RU in such fuels can have a fissile content of approximately 0.9 wt % of $^{235}$U to approximately 1.0 wt % of $^{235}$U. In still other embodiments, the RU in such fuels can have a fissile content of approximately 0.9 wt % of $^{235}$U.

Accordingly, by blending lower $^{235}$U fissile content NU with the higher $^{235}$U fissile content RU, the resulting blended RU/NU nuclear fuel can have a fissile content of less than 1.0 wt % of $^{235}$U in some embodiments. In other embodiments, the resulting blended RU/DU nuclear fuel can have a fissile content of less than 0.8 wt % of $^{235}$U. In other embodiments, the resulting RU/NU nuclear fuel can have a fissile content of less than 0.72 wt % of $^{235}$U. In still other embodiments, the resulting RU/NU nuclear fuel can have a fissile content of approximately 0.71 wt % of $^{235}$U, thereby resulting in a natural uranium equivalent fuel generated by blending RU and NU.

In some embodiments, RU is blended with both DU and NU to produce fuels having the same $^{235}$U fissile contents or content ranges described above in connection with blended RU/DU and blended RU/NU nuclear fuels. In such cases, the $^{235}$U fissile contents and content ranges of RU, and the $^{235}$U fissile contents and content ranges of DU can be the same as those described above.

The nuclear fuels according to the various embodiments of the present invention can include a burnable poison (BP). For example, any of the nuclear fuels described herein can include a blend of RU and DU with a burnable poison (BP), or a blend of RU and NU with a burnable poison (BP). The burnable poison can be blended with the various RU/DU blends, RU/NU blends, and RU/DU/NU blends described herein.

Fuel Bundle Constructions

Nuclear fuel blending (as described above) is a powerful manner of producing fresh nuclear fuels from otherwise unusable RU. However, such blending is only one technique by which RU can be utilized for burning in many types of reactors, including pressurized heavy water reactors. In many applications, the blended RU fuels described herein can be used with great efficiency in fuel bundles depending at least in part upon the locations of such blended fuels in the fuel bundles. Also, RU can even be successfully utilized in fuel bundles without necessarily being blended as described above. Instead, when RU is included in particular locations in a fuel bundle, has certain $^{235}$U fissile contents, and/or is used with targeted combinations of DU and/or NU, the resulting fuel bundle has highly desirable characteristics. These characteristics include greater fuel burnup control and low coolant void reactivity (described below), FIGS. 1-4 illustrate various embodiments of a nuclear fuel bundle for use in a nuclear reactor, such as the pressurized heavy water reactor 10 shown schematically in FIG. 5. In particular, each of FIGS. 1-4 illustrates a cross-sectional view of a number of embodiments of a fuel bundle 14 positioned in a pressure tube 18. The fuel arrangements illustrated in each of FIGS. 1-4 are provided by way of example, it being understood that other fuel arrangements within the fuel bundles of FIGS. 1-4 are possible, and fall within the spirit and scope of the present invention. It should also be noted that the characteristics (including $^{235}$U fissile contents and $^{235}$U fissile content ranges) of the various fuels described in connection with FIGS. 1-4 below (RU, DU, NU, RU/DU blends, RU/NU blends, and RU/DU/NU blends) are provided above.

Heavy water coolant 26 is contained within the pressure tube 18, and occupies subchannels between the fuel elements 22 of the fuel bundle 14. The fuel elements 22 can include a central element 38, a first plurality of elements 42 positioned radially outward from the central element 38, a second plurality of elements 46 positioned radially outward from the first plurality of elements 42, and a third plurality of elements 50 positioned radially outward from the second plurality of elements 46. It should be understood that in other embodiments, the fuel bundle 14 can include fewer or more elements, and can include elements in configurations other than those illustrated in FIGS. 1-4. For example, the fuel elements 22 can be positioned parallel to one another in one or more planes, elements arranged in a matrix or array having a block shape or any other cross-sectional shape, and elements in any other patterned or patternless configuration. The pressure tube 18, the fuel bundle 14, and/or the fuel elements 22 can also be configured in various shapes and sizes. For example, the pressure tubes 18, fuel bundles 14, and fuel elements 22 can have any cross-sectional shapes (other than the round shapes shown in FIGS. 1-5) and sizes desired. As another example, the fuel elements 22 within each fuel bundle 14 can have any relative sizes (other than the uniform size or two-size versions of the fuel elements 22 shown in FIGS. 1-4).

Figure 1:
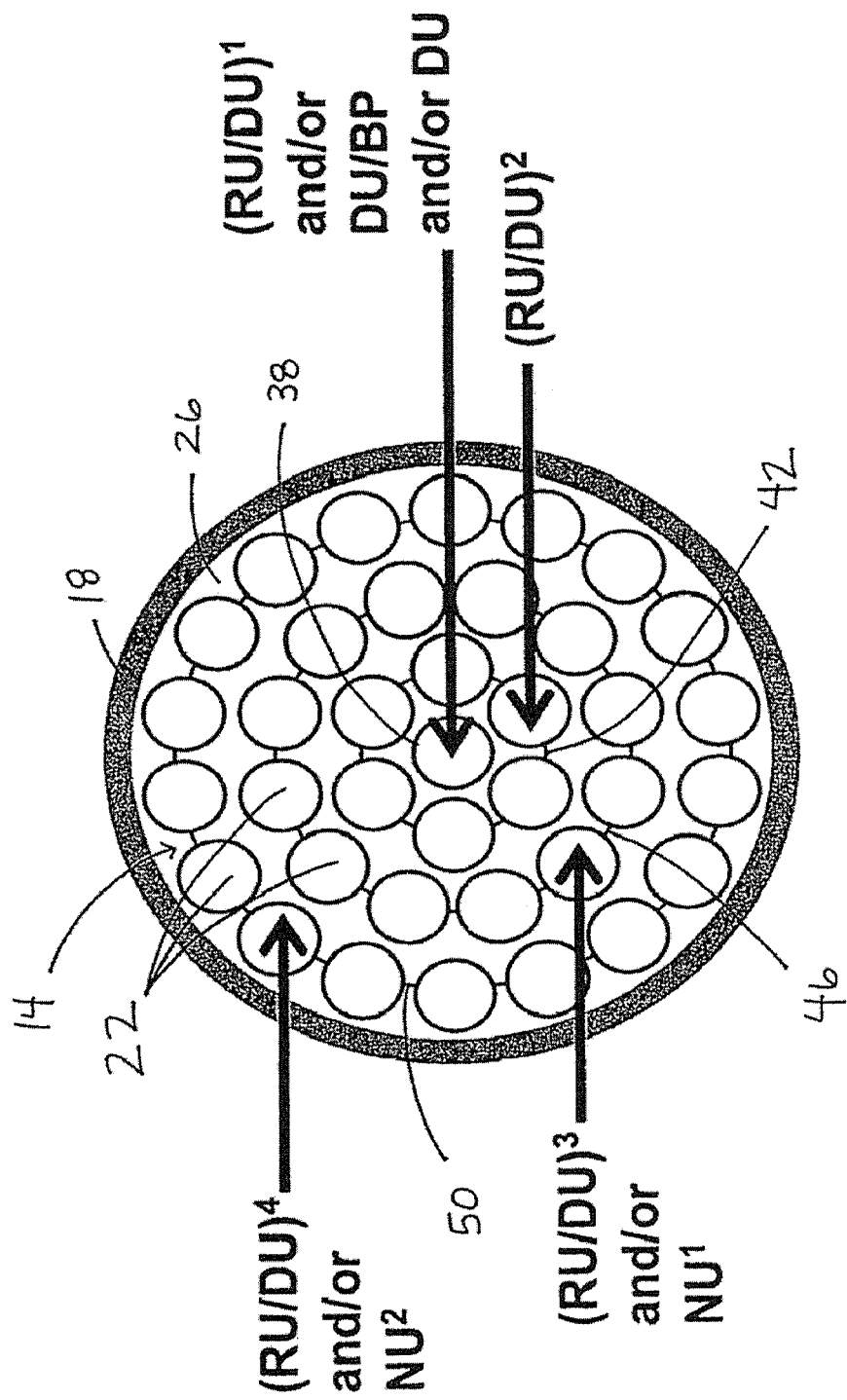
FIG. 1 is a cross-sectional view of a first embodiment of a nuclear fuel bundle in accordance with the invention, showing a number of possible fuel arrangements in the fuel bundle.
Figure 2:
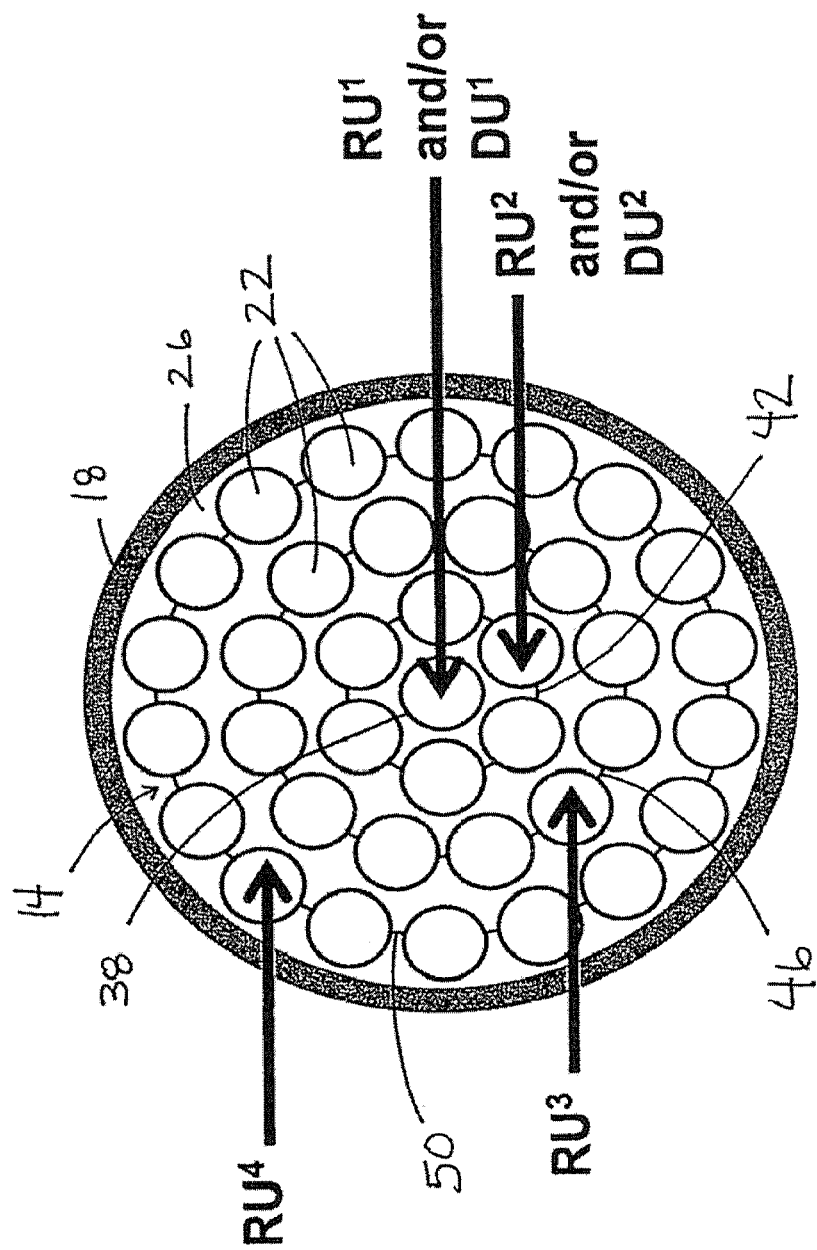
FIG. 2 is a cross-sectional view of a second embodiment of a nuclear fuel bundle in accordance with the invention, also showing a number of possible fuel arrangements in the fuel bundle.

In the embodiments of FIGS. 1 and 2, a 37-element fuel bundle is illustrated in which all of the fuel elements 22 have a uniform cross-sectional size (or diameter, in the case of elements having a round cross-sectional shape). The first plurality of elements 42 in each of FIGS. 1 and 2 includes six elements arranged in parallel with one another in a generally circular pattern. The second plurality of elements 46 in each of FIGS. 1 and 2 includes twelve elements also arranged in parallel with one another in a generally circular pattern. The third plurality of elements 50 in each of FIGS. 1 and 2 includes eighteen elements also arranged in parallel with one another in a generally circular pattern. The central element 38, the first plurality of elements 42, the second plurality of elements 46, and the third plurality of elements 50 are arranged concentrically such that all of the elements 22 are in parallel with one another. It should be understood that the lines included in FIGS. 1 and 2 indicating the generally circular position of the elements 22 is for illustration purposes only, and does not necessarily indicate that elements 22 are tethered together or otherwise coupled in a particular arrangement.

Figure 3:
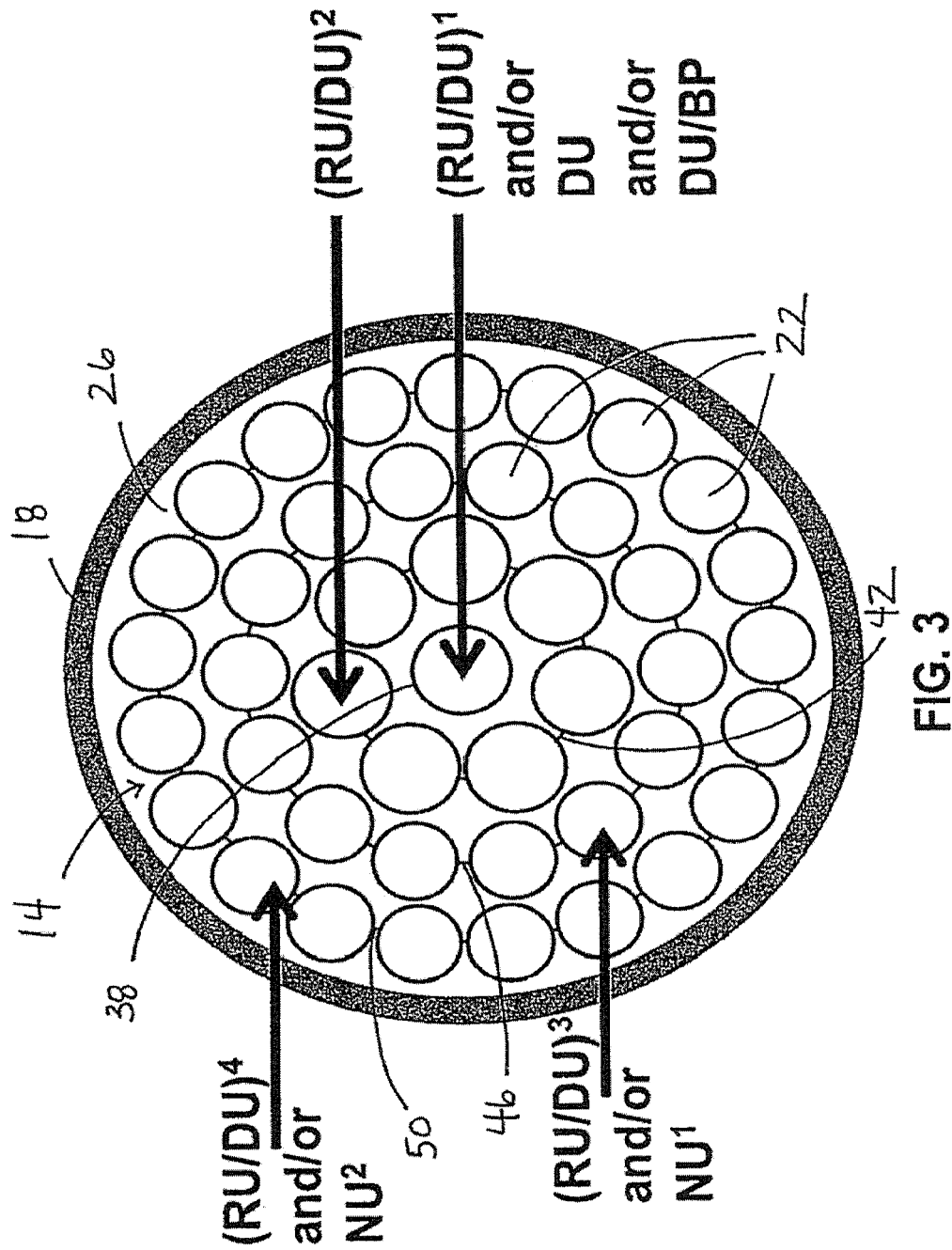
FIG. 3 is a cross-sectional view of a third embodiment of a nuclear fuel bundle in accordance with the invention, also showing a number of possible fuel arrangements in the fuel bundle.
Figure 4:
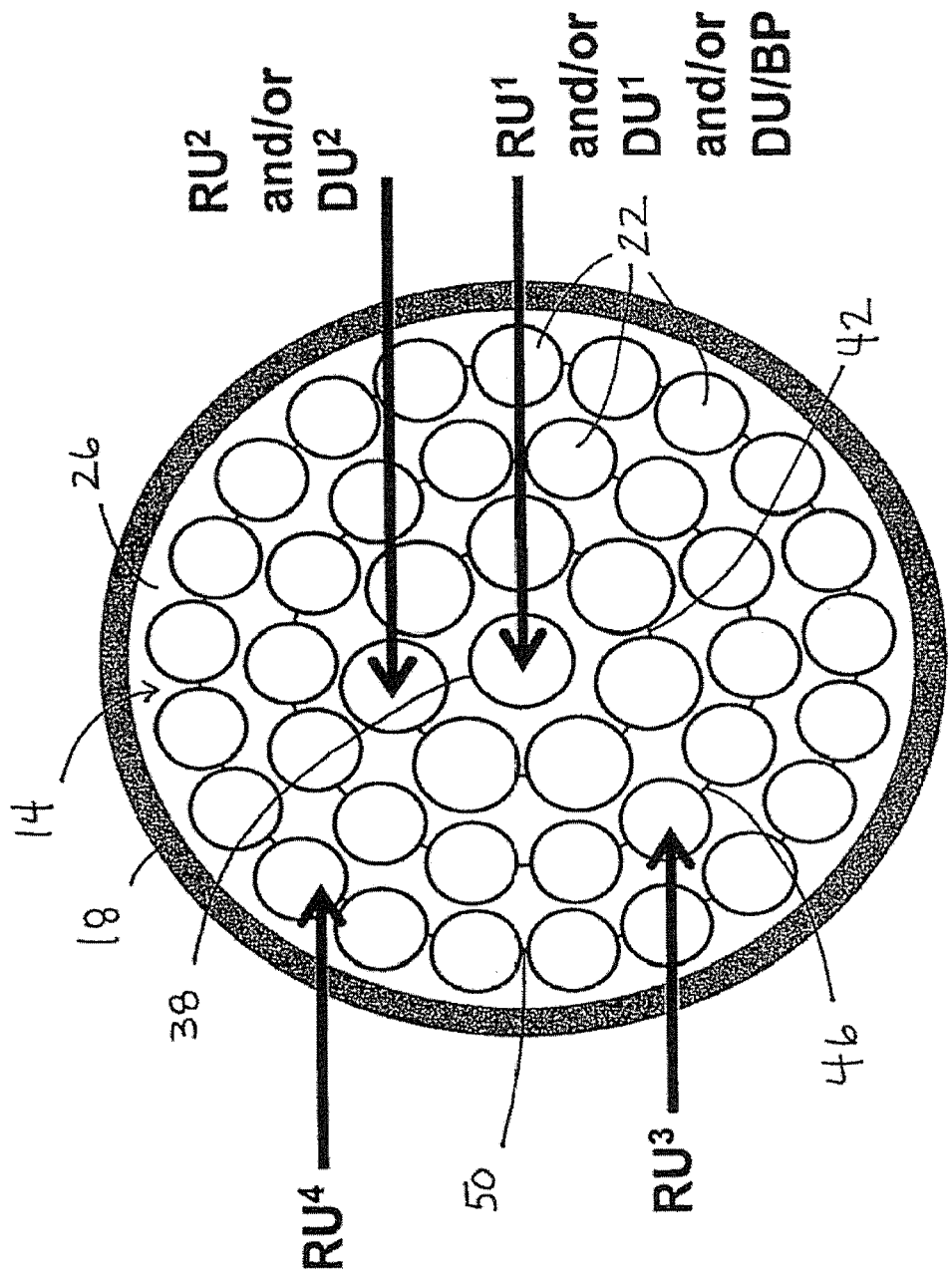
FIG. 4 is a cross-sectional view of a fourth embodiment of a nuclear fuel bundle in accordance with the invention, also showing a number of possible fuel arrangements in the fuel bundle.

In the embodiments of FIGS. 3 and 4, a 43-element fuel bundle 14 is illustrated. The first plurality of elements 42 in each of FIGS. 3 and 4 includes seven elements arranged in parallel with one another in a generally circular pattern. The second plurality of elements 46 in each of FIGS. 3 and 4 includes fourteen elements arranged in parallel with one another in a generally circular pattern. The third plurality of elements 50 in each of FIGS. 3 and 4 includes twenty-one elements arranged in parallel with one another in a generally circular pattern. The central element 38, the first plurality of elements 42, the second plurality of elements 46, and the third plurality of elements 50 are arranged concentrically such that all of the elements 22 are in parallel with one another. The central element 38 and each of the first plurality of elements 42 have a first cross-sectional size (or diameter, in the case of elements having a round cross-sectional shape), and each of the second plurality 46 and third plurality 50 of elements have a second cross-sectional size (or diameter, in the case of elements having a round cross-sectional shape) different from the first cross-sectional size. In particular, the first cross-sectional size is greater than the second cross-sectional size. In this regard, the term "cross-sectional shape" refers to the cross-sectional shape generated by a plane passing through the body referred to in an orientation that is perpendicular to a longitudinal axis of the body. It should also be understood that the lines included in FIGS. 3 and 4 indicating the generally circular position of the elements 22 is for illustration purposes only and does not necessarily indicate that elements are tethered together or otherwise coupled in a particular arrangement.

In some embodiments, each of the fuel elements 22 of FIGS. 1-4 includes a tube filled with nuclear fuel. The tube can be made of or include zirconium, a zirconium alloy, or another suitable material or combination of materials that in some cases is characterized by low neutron absorption. The tube can be filled with one or more materials, such as nuclear fuel alone or in combination with other materials. The material(s) can be in pellet form, powder form, or in another suitable form or combination of forms. In other embodiments, each of the fuel elements 22 includes a rod formed from one or more materials (e.g., nuclear fuel alone or in combination with other materials), such as nuclear fuel contained within a matrix of other material. Also, in some embodiments, the fuel elements 22 in a bundle 14 can include a combination of tubes and rods and/or other fuel-containing elements, and the fuel elements 22 can take on other configurations suitable for the particular application.

As shown in FIGS. 1-4, the fuel elements 22 can include various combinations of nuclear fuels, such as depleted uranium (DU), natural uranium (NU), and reprocessed or recycled uranium (RU). With reference first to FIG. 1, the fuel bundle 14 illustrated therein includes 37 elements. The central element 38 of FIG. 1 includes a blend of RU and DU having a first fissile content (i.e., (RU/DU)$^1$) and/or a blend of DU and a burnable poison (BP) and/or DU. As described above, a blend (generally designated herein by the use of a slash "/" herein) of materials can be created using any method known in the art, such as but not limited to using an acid solution or dry mixing of the subject materials. Returning to FIG. 1, the first plurality of elements 42 includes a blend of RU and DU having a second fissile content (i.e., (RU/DU)$^2$). The second plurality of elements 46 includes a blend of RU and DU having a third fissile content (i.e., (RU/DU)$^3$) and/or NU having a first fissile content (i.e., NU$^1$). The third plurality of elements 50 includes a blend of RU and DU having a fourth fissile content (i.e., (RU/DU)$^4$) and/or NU having a second fissile content (i.e., NU$^2$).

In the embodiments illustrated in FIG. 1, (as well as those of other figures of the present application), materials that have been blended together are referred to with a slash "/". However, in each such case, alternative fuel arrangements for such elements include the use of fuel elements 22 each having only one of the fuels noted, but used in combination with fuel elements 22 having the other fuel noted. The use of such elements 22 of different fuel types (e.g., in the same ring of elements 22) can be provided in place of or in addition to elements 22 having a blend of fuel types as described above.

For example, the ring of (RU/DU)$^2$ elements 22 in FIG. 1 indicates that each illustrated element 22 in the first plurality of elements 36 is a blend of RU and DU. However, alternatively or in addition, the first plurality of elements 36 can instead include one or more elements of RU and one or more elements of DU. The resulting fuel elements 22 containing RU or DU can be arranged in various configurations, such as in an alternating pattern with changing circumferential position about the fuel bundle 14.

In some embodiments, the $^{235}$U fissile content of the RU/DU blends included in the fuel bundle 14 of FIG. 1 are approximately the same (from ring to ring, or with changing radial distance from the center of the fuel bundle 14). In other embodiments, the $^{235}$U fissile content of the RU/DU blends included in the fuel bundle 14 change from ring to ring, or with changing radial distance from the center of the fuel bundle 14. For example, the RU/DU blend included in at least one of the central element 38, the first plurality of elements 42, the second plurality of elements 46, and the third plurality of elements 50 in FIG. 1 can have a fissile content different than a fissile content of a blend included in one or more of the other elements. In some embodiments, an (RU/DU)$^1$ blend included in the central element 38 of FIG. 1 generally has a lower percentage of $^{235}$U than the (RU/DU)$^2$ blend included in the first plurality of elements 42, the (RU/DU)$^2$ blend included in the first plurality of elements 42 generally has a lower percentage of $^{235}$U than any (RU/DU)$^3$ blend included in the second plurality of elements 46, and any (RU/DU)$^3$ blend included in the second plurality of elements 46 generally has a lower percentage of $^{235}$U than any (RU/DU)$^4$ blend included in the third plurality of elements 50. Therefore, the $^{235}$U fissile content of the nuclear fuel included in the fuel bundle 14 can increase in an outward radial direction from the center of the fuel bundle 14. In other embodiments, however, the $^{235}$U fissile content decreases in an outward radial direction from the center of the fuel bundle 14.

Similarly, the fissile content of any NU used in the embodiments of FIG. 1 can be approximately the same or varied with changing distance from the center of the fuel bundle 14. For example, any NU$^1$ included in the second plurality of elements 46 can generally have a lower percentage of $^{235}$U than any NU$^2$ included in the third plurality of elements 50. Alternatively, any NU$^2$ included in the third plurality of elements 50 can generally have a lower percentage of $^{235}$U than any NU$^1$ included in the second plurality of elements 46.

Furthermore, in some embodiments, the particular fissile content of a particular fuel element 22 can be varied throughout one or more of the plurality of elements 42, 46, and 50 (e.g., in a circumferential direction within the fuel bundle 14) or along the longitudinal length of the fuel bundle 14. Also, a BP can be included in any or all of the fuel elements 22 of FIG. 1, such as in the center element 38 as illustrated.

The following fuel bundle arrangements are based upon the fuel bundle embodiments illustrated in FIG. 1, and are presented as examples of fuel bundles having particularly desirable characteristics, but are not to be considered limiting to the scope of the present invention or the other possible embodiments contemplated by FIG. 1. As used herein, the term "ring" includes a center element alone.

EXAMPLE #1

Center element: RU/DU
$1^{st}$ ring of elements 42: RU/DU
$2^{nd}$ ring of elements 46: RU/DU
$3^{rd}$ ring of elements 50: RU/DU

EXAMPLE #2

Center element: $(RU/DU)^1$
$1^{st}$ ring of elements 42: $(RU/DU)^2$
$2^{nd}$ ring of elements 46: $(RU/DU)^3$
$3^{rd}$ ring of elements 50: $(RU/DU)^4$
Wherein $(RU/DU)^2$ has a $^{235}U$ fissile content greater than that of $(RU/DU)^1$, $(RU/DU)^3$ has a $^{235}U$ fissile content greater than that of $(RU/DU)^1$ and/or $(RU/DU)^2$, and/or wherein $(RU/DU)^4$ has a $^{235}U$ fissile content greater than that of $(RU/DU)^1$, $(RU/DU)^2$, and/or $(RU/DU)^3$.

EXAMPLE #3

Center element: $(RU/DU)^1$
$1^{st}$ ring of elements 42: $(RU/DU)^2$
$2^{nd}$ ring of elements 46: $(RU/DU)^3$
$3^{rd}$ ring of elements 50: NU
Wherein $(RU/DU)^2$ has a $^{235}U$ fissile content greater than that of $(RU/DU)^1$, and wherein $(RU/DU)^3$ has a $^{235}U$ fissile content greater than that of $(RU/DU)^1$ and/or $(RU/DU)^2$.

EXAMPLE #4

Center element: $(RU/DU)^1$
$1^{st}$ ring of elements 42: $(RU/DU)^2$
$2^{nd}$ ring of elements 46: NU
$3^{rd}$ ring of elements 50: $(RU/DU)^3$
Wherein $(RU/DU)^2$ has a $^{235}U$ fissile content greater than that of $(RU/DU)^1$, and wherein $(RU/DU)^3$ has a $^{235}U$ fissile content greater than that of $(RU/DU)^1$ and/or $(RU/DU)^2$.

EXAMPLE #5

Center element: $(RU/DU)^1$
$1^{st}$ ring of elements 42: $(RU/DU)^2$
$2^{nd}$ ring of elements 46: NU
$3^{rd}$ ring of elements 50: NU
Wherein $(RU/DU)^2$ has a $^{235}U$ fissile content greater than that of $(RU/DU)^1$ FIG. 2 illustrates another embodiment of a 37-element fuel bundle 14. The central element 38 of FIG. 2 includes RU having a first fissile content (i.e., $RU^1$) and/or DU having a first fissile content (i.e., $DU^1$). The first plurality of elements 42 of FIG. 2 includes RU having a second fissile content (i.e., $RU^2$) and/or DU having a second fissile content (i.e., $DU^2$). The second plurality of elements 46 includes RU having a third fissile content (i.e., $RU^3$). The third plurality of elements 50 includes RU having a fourth fissile content (i.e., $RU^4$).

The $^{235}U$ fissile contents of the RU included in each fuel element 22 can be approximately the same and/or can be varied. In those embodiments where the $^{235}U$ fissile content of the RU in FIG. 2 varies, this change can be with radial distance from the center of the fuel bundle and/or with circumferential position within the fuel bundle 14, and can exist between any or all of the rings shown in FIG. 2, and/or between any or all circumferential positions of any ring. For example, in some embodiments, the $RU^1$ included in the central element 38 generally has a lower percentage of $^{235}U$ than the $RU^2$ included in the first plurality of elements 42, the $RU^2$ blend included in the first plurality of elements 42 generally has a lower percentage of $^{235}U$ than the $RU^3$ included in the second plurality of elements 46, and/or the $RU^3$ included in the second plurality of elements 46 generally has a lower percentage of $^{235}U$ than the $RU^4$ included in the third plurality of elements 50. Therefore, in some embodiments, the $^{235}U$ fissile content of nuclear fuel of the fuel bundle 14 increases in an outward radial direction from the center of the fuel bundle 14. However, in other embodiments, the $^{235}U$ fissile content decreases in an outward radial direction from the center of the fuel bundle 14.

It is to be understood that even when the fissile content of RU included in the fuel bundle 14 of FIG. 2 is varied in any of the manners described above, each fuel element 22 still has a $^{235}U$ fissile content generally between and including approximately 0.72 wt % to approximately 1.2 wt % of $^{235}U$. By way of example only, the fissile content of the $RU^1$ included in the central element 38 is chosen from the range defined above for RU, and the fissile content of the $RU^2$ included in the first plurality of elements 42 is also chosen from the same range defined, but can be different from the fissile content chosen for the central element 38.

Similarly, the fissile content of any DU used in the embodiments of FIG. 2 can be approximately the same or varied—either with radial distance from the center of the fuel bundle 14 or with change in circumferential position within the fuel bundle 14. Again by way of example only, any $DU^1$ included in the central element 38 can generally have a lower percentage of $^{235}U$ than any $DU^2$ included in the second plurality of elements 42. Alternatively, any $DU^2$ included in the second plurality of elements 42 can generally have a lower percentage of $^{235}U$ than any $DU^1$ included in the central element 38.

Furthermore, in some embodiments, the particular fissile content of a particular fuel element 22 can be varied throughout one or more of the plurality of elements 42, 46, and 50 (e.g., in a circumferential direction within the fuel bundle 14) or along the longitudinal length of the fuel bundle 14. Also, a BP can be included in any or all of the fuel elements 22 of FIG. 2.

The following fuel bundle 14 arrangement is based upon the fuel bundle embodiments illustrated in FIG. 2, and is presented as an example of a fuel bundle 14 having particularly desirable characteristics, but is not to be considered limiting to the scope of the present invention or the other possible embodiments contemplated by FIG. 2. As used herein, the term "ring" includes a center element alone.

EXAMPLE #6

Center element: $DU^1$
$1^{st}$ ring of elements 42: $DU^2$
$2^{nd}$ ring of elements 46: $RU^1$
$3^{rd}$ ring of elements 50: $RU^2$
Wherein $DU^2$ has a $^{235}U$ fissile content greater than that of $DU^1$, and wherein $RU^2$ has a $^{235}U$ fissile content greater than that of $RU^1$.

The embodiments of FIG. 3 are substantially similar to the embodiments of FIG. 1 described above, except that the fuel bundle 14 is a 43-element fuel bundle, and has non-uniformly sized fuel elements 22, as described above. Since the distribution of nuclear fuel in the central, first, second, and third pluralities of elements 38, 42, 46, and 50, respectively, is similar to FIG. 1, reference is hereby made to the description accompanying FIG. 1 above for more detail regarding the embodiments (and possible alternatives thereto) shown in FIG. 3.

The following fuel bundle arrangements are based upon the fuel bundle embodiments illustrated in FIG. 3, and are presented as examples of fuel bundles having particularly desirable characteristics, but are not to be considered limiting to the scope of the present invention or the other possible embodiments contemplated by FIG. 3. As used herein, the term "ring" includes a center element alone.

EXAMPLE #7

Center element: RU/DU
$1^{st}$ ring of elements 42: RU/DU
$2^{nd}$ ring of elements 46: RU/DU
$3^{rd}$ ring of elements 50: RU/DU

EXAMPLE #8

Center element: RU/DU
$1^{st}$ ring of elements 42: RU/DU
$2^{nd}$ ring of elements 46: RU/DU
$3^{rd}$ ring of elements 50: NU

EXAMPLE #9

Center element: RU/DU
$1^{st}$ ring of elements 42: RU/DU
$2^{nd}$ ring of elements 46: NU
$3^{rd}$ ring of elements 50: RU/DU

EXAMPLE #10

Center element: DU/BP
$1^{st}$ ring of elements 42: $(RU/DU)^1$
$2^{nd}$ ring of elements 46: $(RU/DU)^2$
$3^{rd}$ ring of elements 50: $(RU/DU)^3$
Wherein $(RU/DU)^2$ has a $^{235}U$ fissile content greater than that of $(RU/DU)^1$, and wherein $(RU/DU)^3$ has a $^{235}U$ fissile content greater than that of $(RU/DU)^2$ and/or $(RU/DU)^1$.

EXAMPLE #11

Center element: DU
$1^{st}$ ring of elements 42: $(RU/DU)^1$
$2^{nd}$ ring of elements 46: $(RU/DU)^2$
$3^{rd}$ ring of elements 50: $(RU/DU)^3$
Wherein $(RU/DU)^2$ has a $^{235}U$ fissile content greater than that of $(RU/DU)^1$, and wherein $(RU/DU)^3$ has a $^{235}U$ fissile content greater than that of $(RU/DU)^2$ and/or $(RU/DU)^1$.

EXAMPLE #12

Center element: DU/BP
$1^{st}$ ring of elements 42: $(RU/DU)^1$
$2^{nd}$ ring of elements 46: $(RU/DU)^2$
$3^{rd}$ ring of elements 50: NU
Wherein $(RU/DU)^2$ has a $^{235}U$ fissile content greater than that of $(RU/DU)^1$.

EXAMPLE #13

Center element: DU/BP
$1^{st}$ ring of elements 42: $(RU/DU)^1$
$2^{nd}$ ring of elements 46: NU
$3^{rd}$ ring of elements 50: $(RU/DU)^2$
Wherein $(RU/DU)^2$ has a $^{235}U$ fissile content greater than that of $(RU/DU)^1$.

The embodiment of FIG. 4 is substantially similar to the embodiment of FIG. 2 described above, except that the fuel bundle 14 is a 43-element fuel bundle, and has non-uniformly sized fuel elements 22, as described above. Since the distribution of nuclear fuel in the central, first, second, and third pluralities of elements 38, 42, 46, and 50, respectively, is similar to FIG. 2, reference is hereby made to the description accompanying FIG. 2 above for more detail regarding the embodiments (and possible alternatives thereto) shown in FIG. 4.

The following fuel bundle arrangements are based upon the fuel bundle embodiments illustrated in FIG. 4, and are presented as examples of fuel bundles having particularly desirable characteristics, but are not to be considered limiting to the scope of the present invention or the other possible embodiments contemplated by FIG. 4. As used herein, the term "ring" includes a center element alone.

EXAMPLE #14

Center element: DU/BP
$1^{st}$ ring of elements 42: RU
$2^{nd}$ ring of elements 46: RU
$3^{rd}$ ring of elements 50: RU

EXAMPLE #15

Center element: DU
$1^{st}$ ring of elements 42: RU
$2^{nd}$ ring of elements 46: RU
$3^{rd}$ ring of elements 50: RU

EXAMPLE #16

Center element: DU
$1^{st}$ ring of elements 42: DU
$2^{nd}$ ring of elements 46: RU
$3^{rd}$ ring of elements 50: RU The embodiments of FIGS. 3 and 4 provide examples of how the particular number of fuel elements, the fuel element arrangement (e.g., rings of elements in the illustrated embodiments), fuel element sizes, and relative fuel element sizes can change while still embodying the present invention. In some embodiments, the $^{235}U$ fissile content of nuclear fuel decreases in an outward radial direction from the center of the fuel bundle 14. In other embodiments, the $^{235}$U fissile content increases in an outward radial direction from the center of the fuel bundle 14.

In heavy water cooled reactors, the rate of neutron multiplication increases when coolant voiding occurs. Coolant voiding occurs, for example, when coolant starts to boil. Coolant void reactivity is a measure of the ability of a reactor to multiply neutrons. This phenomenon is due to positive coolant void reactivity, and can occur in all reactors for different scenarios. The present invention can provide a significant reduction in coolant void reactivity, and can also provide a negative fuel temperature coefficient and/or a negative power coefficient.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention. For example, in various embodiments described and/or illustrated herein, RU and DU blends are further blended with different types of nuclear fuel or other materials to produce nuclear fuels having desired fissile contents. For example, the RU and DU can be blended (alone or as an RU/DU blend) with slightly enriched uranium (SEU) and low enriched uranium (LEU). As defined herein, SEU has a fissile content of approximately 0.9 wt % to approximately 3 wt % of $^{235}$U (including approximately 0.9 wt % and approximately 3 wt %), and LEU has a fissile content of approximately 3 wt % to approximately 20 wt % of $^{235}$U (including approximately 3 wt % and approximately 20 wt %).

Also, the embodiments described herein may be used with pressure tubes larger or smaller than those used in current pressure tube reactors and may also be used in future pressure tube reactors. Furthermore, the present invention can be employed in fuel bundles having a different number and arrangement of elements, and is not limited to 43-element and 37-element fuel bundle designs and arrangements, such as those illustrated by way of example in FIGS. 1-4. For example, although the embodiments of FIGS. 3 and 4 utilize two different element sizes in the illustrated fuel bundles 14, whereas the embodiments of FIGS. 1 and 2 utilize uniform element sizes across the illustrated fuel bundles 14, it will be appreciated that any of the fuel bundles described herein can have the same or differently-sized elements in different rings and/or different circumferential positions within the fuel bundles while still falling within the spirit and scope of the present invention. As another example, larger element sizes need not necessarily be located only in the first and/or second rings of a fuel bundle 14. In other embodiments, such relatively larger element sizes are located in radially outer rings of the fuel bundle 14 (e g., the radially outermost ring and/or ring adjacent thereto).

The invention claimed is:

1. A fuel bundle for a heavy water nuclear reactor, the fuel bundle comprising:
a plurality of fuel elements each including
a first fuel component of recycled uranium; and
a second fuel component of at least one of depleted uranium and natural uranium blended with the first fuel component,
a central fuel element comprising depleted uranium blended with a burnable poison,
wherein the central element is centrally located in the fuel bundle,
wherein the blended first and second fuel components have a first fissile content of less than 1.2 wt % of $^{235}$U, and
wherein the plurality of fuel elements, when burned by the nuclear reactor, has a negative fuel temperature coefficient provided at least in part by the depleted uranium blended with the burnable poison being centrally located within the fuel bundle.

2. The fuel bundle of claim 1, wherein the plurality of fuel elements includes a ring of six substantially parallel tubes each containing the blend of the first and second fuel components.

3. The fuel bundle of claim 2, wherein the second fuel component comprises depleted uranium.

4. The fuel bundle of claim 2, wherein the second fuel component comprises natural uranium having a fissile content of approximately 0.71 wt % of $^{235}$U.

5. The fuel bundle of claim 1, wherein the plurality of fuel elements is a first plurality of fuel elements, the fuel bundle further comprising a second plurality of fuel elements forming a ring around the first plurality of fuel elements.

6. The fuel bundle of claim 5, wherein the second plurality of fuel elements includes natural uranium having a fissile content of approximately 0.71 wt % of $^{235}$U.

7. The fuel bundle of claim 5, wherein the second plurality of fuel elements includes a blend of recycled uranium and depleted uranium.

8. The fuel bundle of claim 7, wherein a fissile content of the blend of recycled uranium and depleted uranium in the second plurality of fuel elements is greater than the first fissile content.

9. The fuel bundle of claim 5, wherein the second plurality of fuel elements includes twelve substantially parallel tubes positioned radially outward from the first plurality of fuel elements.

10. The fuel bundle of claim 5, further comprising a third plurality of fuel elements forming a ring around the second plurality of fuel elements.

11. The fuel bundle of claim 10, wherein the third plurality of fuel elements includes natural uranium having a fissile content of approximately 0.71 wt % of $^{235}$U.

12. The fuel bundle of claim 10, wherein the third plurality of fuel elements includes a blend of recycled uranium and depleted uranium.

13. The fuel bundle of claim 12, wherein a fissile content of the blend of recycled uranium and depleted uranium in the third plurality of fuel elements is greater than a fissile content of the blend of recycled uranium and depleted uranium in the second plurality of fuel elements.

14. The fuel bundle of claim 10, wherein the third plurality of fuel elements includes eighteen substantially parallel tubes positioned radially outward from the second plurality of fuel elements.

15. The fuel bundle of claim 1, wherein the central fuel element is located at the center of the fuel bundle.

16. The fuel bundle of claim 15, wherein the central fuel element includes a blend of recycled uranium and depleted uranium.

17. The fuel bundle of claim 16, wherein a fissile content of the blend of recycled uranium and depleted uranium of the central fuel element is less than the first fissile content.

18. The fuel bundle of claim 1, wherein the plurality of fuel elements includes a ring of seven substantially parallel tubes each containing the blend of the first and second fuel components.

19. The fuel bundle of claim 18, wherein the plurality of fuel elements is a first plurality of fuel elements, the fuel bundle further comprising a second plurality of fuel elements located radially outward from the first plurality of fuel elements.

20. The fuel bundle of claim 19, wherein the second plurality of fuel elements includes natural uranium having a fissile content of approximately 0.71 wt % of $^{235}$U.

21. The fuel bundle of claim 19, wherein the second plurality of fuel elements includes a blend of recycled uranium and depleted uranium.

22. The fuel bundle of claim 21, wherein a fissile content of the blend of recycled uranium and depleted uranium in the second plurality of fuel elements is greater than the first fissile content.

23. The fuel bundle of claim 19, wherein the second plurality of fuel elements includes fourteen parallel tubes positioned radially outward from first plurality of fuel elements.

24. The fuel bundle of claim 19, wherein at least one of the second plurality of fuel elements is different in cross-sectional size than that of at least one of the first plurality of fuel elements.

25. The fuel bundle of claim 19, further comprising a third plurality of fuel elements forming a ring around the second plurality of fuel elements.

26. The fuel bundle of claim 25, wherein the third plurality of fuel elements includes natural uranium having a fissile content of approximately 0.71 wt % of $^{235}$U.

27. The fuel bundle of claim 25, wherein the third plurality of fuel elements includes a blend of recycled uranium and depleted uranium.

28. The fuel bundle of claim 27, wherein a fissile content of the third plurality of fuel elements is greater than a fissile content of the second plurality of fuel elements.

29. The fuel bundle of claim 25, wherein the third plurality of fuel elements includes twenty-one substantially parallel tubes positioned radially outward from the second plurality of fuel elements.

30. The fuel bundle of claim 25, wherein at least one of the third plurality of fuel elements is different in cross-sectional size than that of at least one of the first plurality of fuel elements.

31. The fuel bundle of claim 25, wherein the central fuel element located at the center of the fuel bundle.

32. The fuel bundle of claim 31, wherein the central fuel element includes a blend of recycled uranium and depleted uranium.

33. The fuel bundle of claim 32, wherein a fissile content of the blend of recycled uranium and depleted uranium of the central fuel element is less than the first fissile content.

* * * * *